United States Patent [19]

Jacobsen et al.

[11] Patent Number: 5,181,745
[45] Date of Patent: Jan. 26, 1993

[54] PRINTED IMAGE CREATING THE PERCEPTION OF DEPTH

[76] Inventors: Gary A. Jacobsen, 225 S. Cherry, Itasca, Ill. 60143; Roger V. Jacobsen, 6049 N. Lawndale, Chicago, Ill. 60659

[21] Appl. No.: 635,362

[22] Filed: Dec. 28, 1990

[51] Int. Cl.$^5$ ............................................. B42D 15/00
[52] U.S. Cl. ..................................... 283/94; 283/107; 283/904; 283/109
[58] Field of Search ................... 283/94, 109, 107, 904

[56] References Cited

U.S. PATENT DOCUMENTS

| | | |
|---|---|---|
| 1,700,616 | 1/1929 | Thornton . |
| 1,873,674 | 8/1932 | Thornton . |
| 2,188,697 | 1/1940 | Yanes . |
| 2,357,624 | 9/1944 | Amdur . |
| 3,520,588 | 7/1970 | Salyer et al. . |
| 3,776,725 | 12/1973 | McCann et al. . |
| 4,255,047 | 3/1981 | Chevin et al. . |
| 4,305,768 | 12/1981 | Lontz . |
| 4,313,984 | 2/1982 | Moraw et al. ............... 283/109 X |
| 4,376,159 | 3/1983 | Spechler . |
| 4,390,271 | 6/1983 | Smith . |
| 4,824,503 | 4/1989 | Wilen . |

FOREIGN PATENT DOCUMENTS 2838795  3/1980  Fed. Rep. of Germany ...... 283/109

OTHER PUBLICATIONS

*American Printer*, "Old Ideas, New Methods", Sep. 1990, pp. 60–63.

*Primary Examiner*—Paul A. Bell
*Attorney, Agent, or Firm*—Welsh & Katz, Ltd.

[57] ABSTRACT

A printed image, suitable for creating an illusion of depth in the perception of a viewer of the image, comprises a multilayer transparent laminate structure having a back surface and a viewing front surface. A number of the layers in the laminate structure each has a portion of the perceived image printed upon at least one surface of the layer front and back surfaces. That portion of the image perceived to be most distant from the viewer is located upon a printed layer which is furthest from the viewing front surface of the laminate structure, and that portion of the image percieved to be most proximate to the viewer is located upon a printed layer closest to the viewing front surface. The portions of the image perceived to be at varying distances therebetween are located upon intermediate printed layers in a sequence which corresponds to the perceived varying distances of the intermediate image portions. At least a majority of the image portions are dissimilar parts of the perceived image. Generally, the laminate structure contains a plurality of layers each having a portion of the perceived image printed upon the layer front surface, but a layer may have a part of the image on its front surface and another part on its back surface. Depth perception may be further enhanced by the insertion of transparent unprinted panels between printed layers.

46 Claims, 4 Drawing Sheets

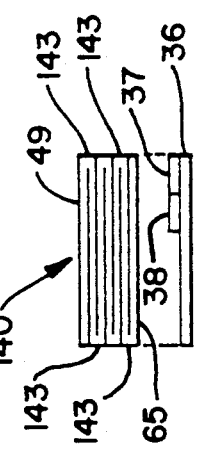
FIG. 12
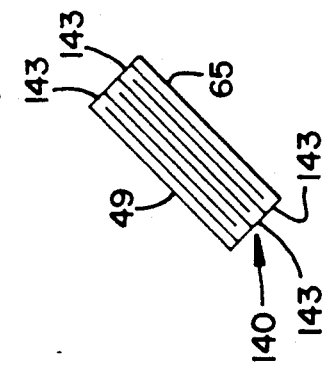
FIG. 11
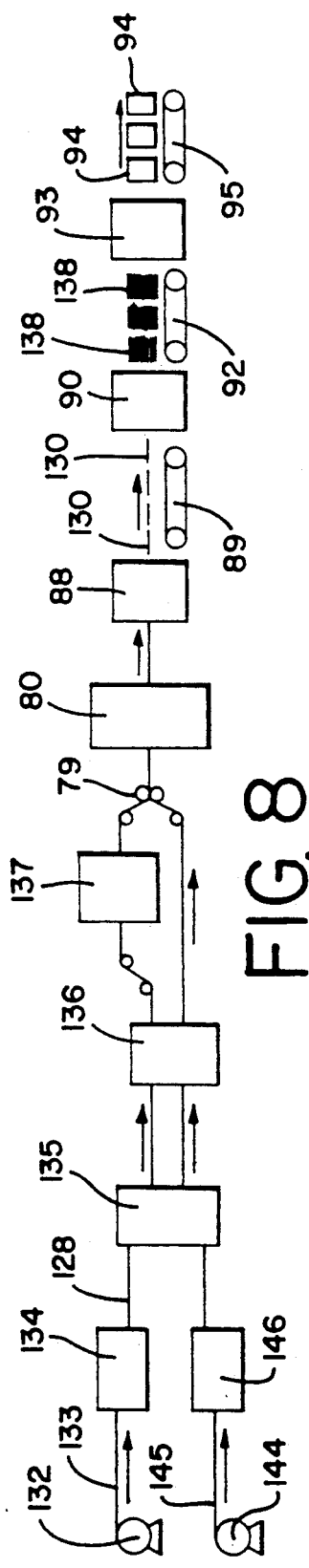
FIG. 13
FIG. 8
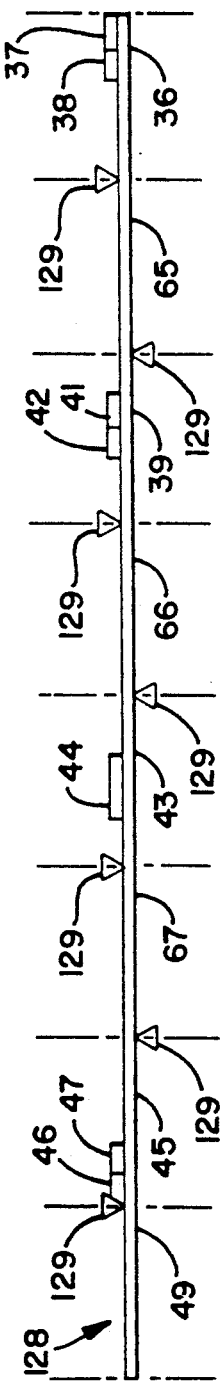
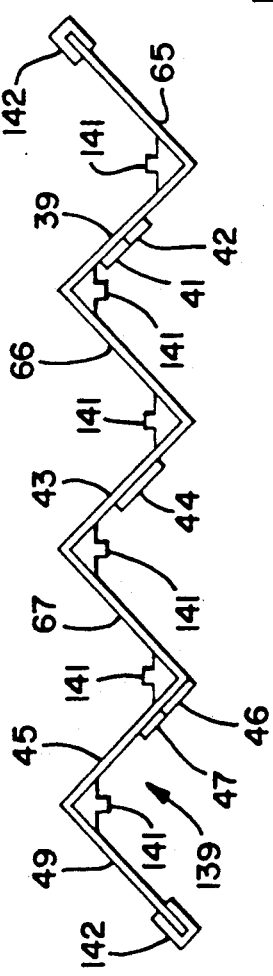
FIG. 10

PRINTED IMAGE CREATING THE PERCEPTION OF DEPTH

BACKGROUND OF THE INVENTION

The present invention relates to the field of mid to high volume commercial printing, and more particularly to the printing of consumer product images for advertising literature, newspaper or magazine supplemental inserts, magazine covers, greeting cards, photographs, and the like in such a manner that the printed images give the illusion of depth. More particularly, the present invention relates to printed structures including an image which creates the perception of three dimensions. Additionally, the present invention relates to methods and structures for images simulating a hologram.

It is well known by those knowledgeable in the art, that three-dimensional images and holographic images are generally produced by cameras and other photographic and optical equipment which are of considerable size and complexity. Such equipment and the techniques utilized for producing such images entail the outlay of substantial capital and operating expenditures.

Accordingly, it is an object of the present invention to provide images giving the perception of depth or of three dimensions utilizing printing rather than photographic or optical techniques.

It is another object of the present invention to provide printed images which simulate a hologram.

It is a further object of the present invention to provide such images in a facile and economical manner.

These and other objects of the present invention, as well as the advantages thereof, will become more clear from the disclosure which follows.

SUMMARY OF THE INVENTION

In its simplest aspects, the present invention comprehends a two layer picture. The top layer is made of a transparent film having one printed image, which is preferably made using a web-offset printing process of flexographic process. The bottom layer, typically paper, has a second printed image, which could be a background image. When the top transparent sheet is placed over the bottom paper sheet, the combination gives a three-dimensional or holographic effect. If the bottom sheet is printed using metallic inks, a highlighting and/or fading effect is created.

A further example of the new technique would be as if a person took four separate pictures, each one showing an image at a different distance. For example, the image could include (A) a pond, (B) a tree on the other side of the pond, (C) a house further away from the tree, and (D) a background of mountains and sky. Once all of the elements (A)-(B)-(C)-(D) are placed on top of each other and composed, the image becomes one unitary element showing depth as a three-dimensional picture would, or giving the effect of a hologram.

To the best of present knowledge, both holograms and three-dimensional images are produced photographically. However, some are printed on offset presses, but assembled at a separate time, requiring as many as five steps to complete one fully assembled product, thus making the production costs high. Our invention takes all elements and manufacturers them in one complete press pass, thereby delivering a complete finished product, ready for consumer use.

The illusion of depth can be further enhanced by inserting one or more transparent sheets between the top and bottom layers or between all imaged layers. The outer sheet could also be die cut to hold the top transparent sheet further away from the background sheet or vice versa to create a greater illusion of depth or to provide a sophisticated border. Other variations could include printing portions of the same image on each of the sheets or having faded images printed on the bottom sheet. It is also possible to print both sides of the transparent sheet on the paper sheet, or to print different colors at different locations on various transparent sheets, thus altering the multi-dimensional effect of the finished product.

The invention contemplates printing multilayered documents on an in-line web-offset or flexographic type printing system wherein all of the printing and finishing operations are accomplished in a single pass at the web press speed. The in-line printing and finishing technique is much faster and more economical than the conventional off-line systems, wherein the steps of die cutting, folding, laminate gluing, laminating, trimming, correlating, etc. are performed off-line by a bindery. Although in-line printing and finishing systems are known in the art, we are unaware of any such system which can produce multilayer printing pictures as described above.

Accordingly, in one aspect, the present invention comprehends a printed image, suitable for creating an illusion of depth in the perception of a viewer of the image, which comprises a multilayer transparent laminate structure having a back surface and a viewing front surface, wherein at least a number of the layers in the laminate structure each has a portion of the perceived image printed upon at least one surface of the layer front and back surfaces.

In addition, the present invention further comprehends a printed image which comprises a multilayer transparent laminate structure having a back surface and a viewing front surface, wherein at least a number of the layers in the laminate structure each have a portion of the perceived image printed upon at least one surface of the layer front and back surfaces, with that portion of the image perceived to be most distant from the viewer being located upon a printed layer which is furthest from the viewing front surface of the laminate structure, with that portion of the image perceived to be most proximate to the viewer being located upon a printed layer closest to the viewing front surface, and with the portions of the image perceived to be at varying distances therebetween being located upon intermediate printed layers in a sequence which corresponds to the perceived varying distances of the intermediate image portions.

In a still further aspect, the present invention comprehends a printed image, suitable for creating an illusion of depth in the perception of a viewer of the image, which comprises a multilayer transparent laminate structure having a back surface and viewing front surface, wherein at least a number of the layers in the laminate structure each have a portion of the perceived image printed upon at least one surface of the layer front and back surfaces, with that portion of the image perceived to be most distant from the viewer being located upon a printed layer which is furthest from the viewing front surface of the laminate structure, with that portion of the image perceived to be most proximate to the viewer being located upon a printed layer closest to the viewing front surface, and with at least a majority of the image portions being dissimilar parts of the perceived image.

In addition, the present invention comprehends the foregoing three printed images defined hereinabove wherein the multilayer transparent laminate structure contains a plurality of layers each having a portion of the perceived image printed upon the layer front surface.

Additionally, the present invention comprehends the foregoing three defined printed images wherein at least a portion of the number of the layers each has a first part of the perceived image printed upon the front surface of the layer and a second part of the perceived image printed upon the back surface of the layer.

A clearer understanding of the present invention will be obtained from the disclosure which follows when read in light of the accompanying drawings.

BRIEF DESCRIPTION OF THE DRAWINGS

FIG. 8 is a simplified schematic representation shown as a front elevational or edge view, of a wide web containing eight panels which are printed in selected areas and then finished into an accordion-like structure to produce a laminated printed image according to FIG. 4.

FIG. 10 is a simplified schematic representation similar to FIG. 8, but showing a wide web of seven panels partially folded.

FIG. 11 is a simplified schematic representational view of a folded and flattened laminate resulting from the wide web of FIG. 10.

FIG. 12 is a simplified schematic representational front elevational view of the seven layer laminate of FIG. 11, brought into position for lamination to a single panel to provide an opaque back layer for the production of a final eight layer laminate.

FIG. 13 is a simplified schematic representation of a production line for fabricating the structures of FIGS. 8-12.

DESCRIPTION OF THE PREFERRED EMBODIMENTS

Figure 1:
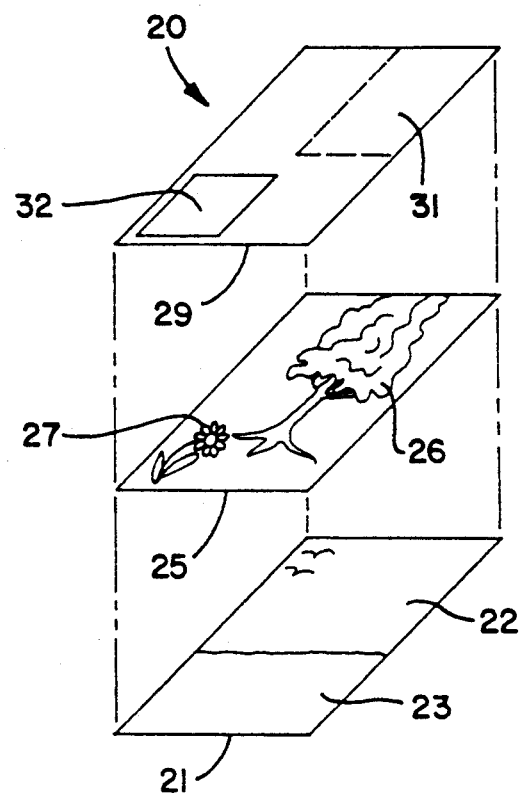
FIG. 1 is a simplified schematic representation of one embodiment of the present invention showing a printed image comprising a two layer laminate with an optional cover layer shown in an exploded view.

Referring now to FIG. 1, there is shown a laminated structure 20 which simulates a three-dimensional image. For purposes of clarity, the laminate is shown in an exploded view. The laminate consists of a bottom image layer or panel 21 of an opaque sheet which may be plastic or paper, showing an upper image 22 of two birds in a blue sky which is printed on the top surface of the panel 21. Below the birds and the blue sky is a lower image 23 of blue-green grass at the horizon, with increasingly brighter green grass toward the bottom of the panel 21. The lower image 23 is also printed on the top surface of the layer 21. The laminate structure 20 also includes a second image layer or panel 25 of a clear transparent polymer (plastic) which contains an image 26 of a tree in the background which is printed on the top surface of the panel 25, and an image 27 of a flower in the foreground which is also printed on the top surface of the clear transparent panel 25. A clear transparent polymeric cover panel 29 may be optionally used in the laminated structure 20 of this embodiment. The optional cover panel 29 may have an optional printed area 31 on the top surface for application of advertising copy or printed text, such as for a child's book, catalog, or the like. In addition, the clear transparent polymeric cover panel 29 may include an optional die cut opening 32. This die cut opening 32 provides an aperture in the clear transparent top panel which frames the image 27 of the flower in the foreground.

Although FIG. 1 shows the panels or layers in an exploded view, those skilled in the art can clearly recognize that the laminate structure will have the panels adjacent each other in surface-to-surface contact. The printing which would appear in the region 31 of the cover panel 29 will appear in a foreground spaced relationship in front of the images 26 and 27 which have been printed on the second image panel 25. These images, being printed on the upper surface of panel 25, will also appear to the perception of the viewer to be spaced in front of the images of the bottom panel 21, namely the blue sky with the birds 22 and the grass with the horizon 23, producing a perception of depth.

Figure 2:
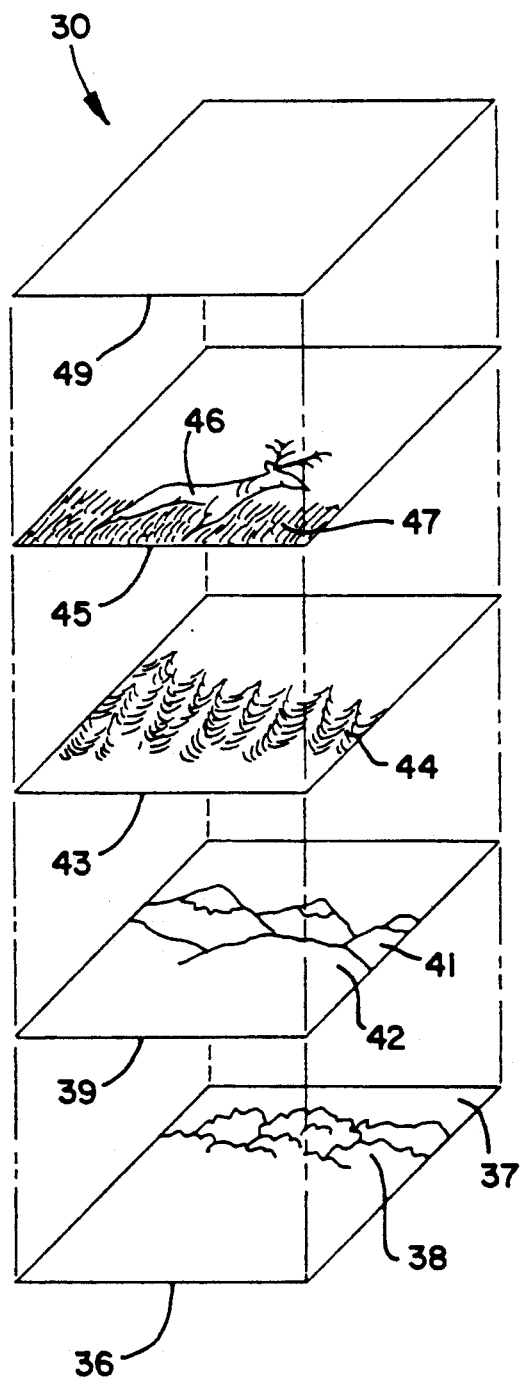
FIG. 2 is a simplified schematic representation of another embodiment of the present invention showing a printed image comprising a four layer laminate with an optional cover layer shown in an exploded view.

FIG. 2 illustrates another laminated structure 30 for simulating a three-dimensional image. The laminated structure 30, also shown in an exploded view, contains four printed images and an optional cover layer. The bottom image panel 36 is made of an opaque web of plastic or paper. On its upper surface there is printed an image 37 of a blue sky and an image 38 of white clouds. Above the bottom panel 36 is a second image panel 39 which is made of a clear transparent polymer. Panel 39 has an image printed on its upper surface of blue-grey mountains 41 with white caps of snow. In addition, the upper surface of the second image panel 39 contains the image 42 of light grey foothills. A third image panel 43 of clear transparent polymer is imposed above the second image panel 39 and it has printed on its upper surface an evergreen forest 44. The fourth image panel 45 of clear transparent polymeric film shows a foreground image 46 of an elk standing in a foreground of green meadow grass. The background image 47 also shows green meadow grass, but it provides a background which has a darker green or bluish-green color. The two images 46 and 47 are also printed upon the upper surface of the panel 45. As hereinabove noted, a clear transparent polymeric cover panel 49 may optionally be placed upon the fourth image panel 45. Panel 49 is shown as a clear transparent panel, but it also may have an area of printed text such as the areas 31 on panel 29 in FIG. 1. Additionally, it also may have a die cut aperture to frame the elk 46.

Figure 3:
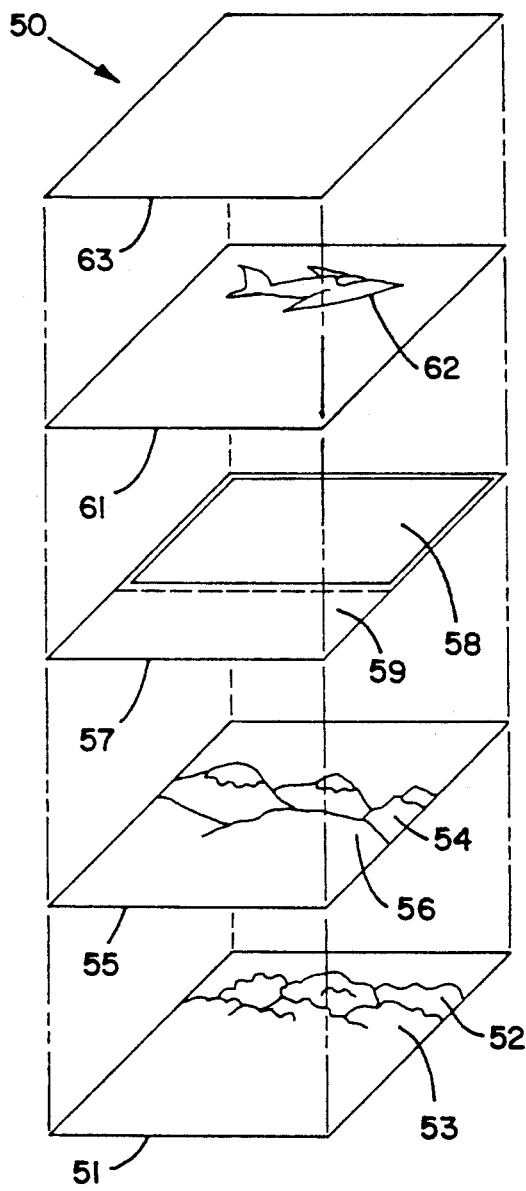
FIG. 3 is a simplified schematic representation of another embodiment of the present invention showing a printed image comprising a four layer laminate with an optional cover layer shown in an exploded view, where one internal layer contains a die cut opening.

FIG. 3 shows the exploded side elevational view of another laminated structure 50 for simulating a three-dimensional image. The laminated structure 50 has a bottom image panel 51 of opaque paper upon which is printed an image 52 of blue sky and an image 53 of white clouds, said images being printed on the upper surface of the web 51. A second image panel 55 contains, printed upon its upper surface, an image 54 showing snow capped mountains of blue-grey coloration and an image 56 showing light grey foothills. The third image panel 57 is made of an opaque paper, and it contains a die cut aperture 58 in its upper portion which frames the superimposed images of the panels below, 55 and 51, respectively. The lower portion 59 of the third image panel 57 may contain printed text such as advertising copy of the text of a child's book, adventure book, or the like. A fourth panel 61 is provided above the lower panels which is of a clear transparent polymer. Panel 61 has an image 62 of an aircraft in flight which will appear closer to the viewer than the clouds 53, mountains 54, foothills 56 or printed text 59. This embodiment also may have an optional cover panel 63 which protects the printing of the image 62 upon the panel 61. Additionally, opaque panel 57 could be a clear transparent panel, if so desired.

Figure 4:
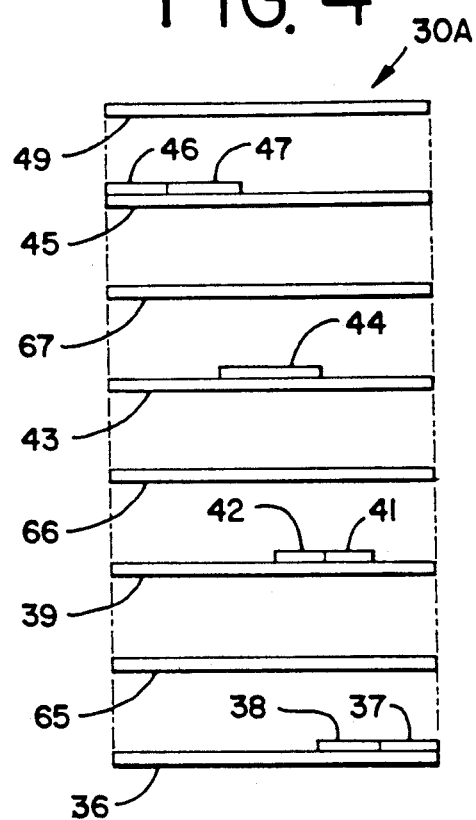
FIG. 4 is a simplified schematic representation of another embodiment of the present invention showing a printed image comprising an eight layer laminate containing alternating printed layers and unprinted layers shown as an exploded side elevational view.

FIG. 4 illustrates in an exploded side elevational view an eight layer laminated structure 30A which presents an image to the viewer which is identical to that shown in FIG. 2. The difference between the laminate structure 30 of FIG. 2 and the laminate structure 30A of FIG. 4 is that the dimensional effect of the images has been enhanced in the eight layer structure 30A by the insertion of additional clear transparent panels which provide an added spacing between portions of the image. Referring now to FIG. 4, it will be seen that the bottom panel 36 has the images 38 and 37 printed on its upper surface. A first spacer panel of clear transparent polymer 65 is between the bottom image panel 36 and the next or second image panel 39 so that the blue-grey mountains 41 and the light grey foothills 42 which are printed on the upper surface of panel 39 appear to be at a greater distance from the blue sky 37 and the white clouds 38 printed on the upper surface of panel 36. Similarly, a spacer panel 66 of clear transparent plastic is above the second image panel 39 so that the image 44 of the evergreen forest which is on the upper surface of panel 43 is spaced an added distance in front of the image 41 of the mountains and the images 42 of the foothills. A third spacer panel 67 is then placed above the image panel 43 so that the image 44 of the evergreen forest is further behind the images 46 and 47 which are printed on the top surface of panel 45. By interspersing the printed panels with alternating clear transparent panels as shown in this embodiment, a greater sense of depth is perceived by the viewer and a greater sense of three-dimensional viewing is accomplished.

Figure 5A:
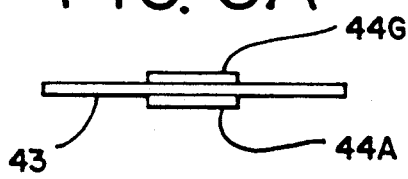
FIG. 5A is a simplified schematic representation of the side view of a printed layer of FIG. 5, having congruent images on both the upper and lower surfaces of the layer.
Figure 5:
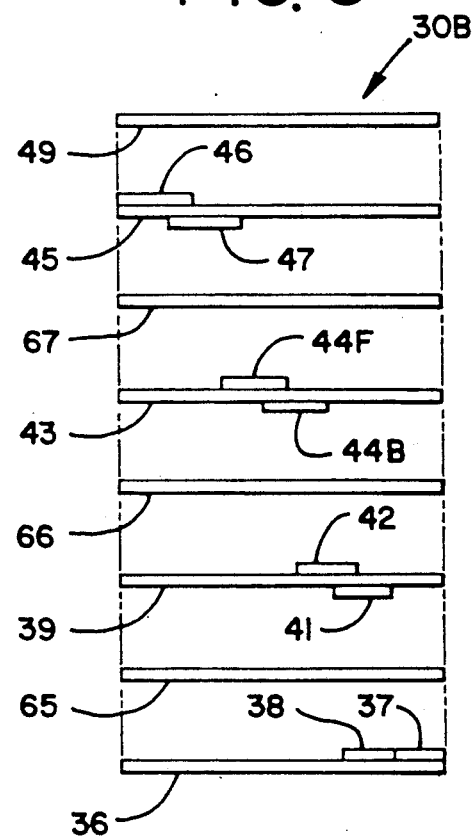
FIG. 5 is a simplified schematic representation of another embodiment of the present invention showing a printed image comprising an eight layer laminate containing alternating printed layers and unprinted layers shown as an exploded side elevational view, wherein some printed layers are printed on both surfaces of the layer.

FIG. 5 is an exploded side elevational view of a laminate which is similar to the embodiment of FIG. 4, with the difference being that the printed panels have images printed on both the upper surfaces and the lower surfaces. The laminated structure 30B projects the same image as the laminate structures 30A and 30. But the difference is that a portion of the given image which appears on a given panel is printed on the upper surface of that printed panel and another portion of the given image is printed on the lower surface of that same panel. Thus, panel 39 has the image of the blue-grey mountains 41 printed on the bottom surface and the image of the light grey foothills 42 printed on the upper surface. This gives an added perception of depth, since now the image of the foothills is spaced away from the image of the mountains. Similarly, panel 43 has the evergreen forest presented as two distinct printed images, with image 44F printed on the upper surface of panel 43 to show the foreground portion of the forest and image 44B printed on the bottom surface of panel 43 to show the background portion of the forest. Generally, the coloration of the image 44F will be of a lighter green than the coloration of the image 44B, since the more distant background portion of the forest represented by image 44B will generally have a bluish-green cast to simulate that which is optically crested in nature by the viewing distance. By printing image 44B with such a blue-green cast, the viewer will thus perceive an enhanced sense of distance and depth. Panel 45 also has the image printed on top and bottom surfaces, with the foreground image 46 containing the elk and the greener foreground portion of the meadow grass printed on the top surface, and the background image of the meadow grass 47 printed on the bottom surface. As with thge coloration of the forest, the printed color of the meadow grass in foreground image 46 will be lighter than the printed color of the more distant meadow grass in image 47, so that an enhanced sense of distance appears within the panel 45.

FIG. 5A shows an alternate method of providing for different coloration of the image on a given panel to enhance the sense of distance. For illustrative purposes, the panel 43 is shown in FIG. 5A with the images 44G and 44A being superimposed and congruent. The image 44G shows the entire evergreen forest in a light gree hue on the top surfaces, and the image 44A on the bottom surface of panel 43 also shows the entire image of the forest. However, image 44A is printed at the background portion of the forest in a blue-green color which passes through the transparent structure of panel 43 and through the light green coloration of the image 44G. Alternatively, image 44A may be printed in a blue coloration with no green at all at the background portion of the forest. Regardless of which color is selected for images 44A, the net result will be that light emanating from the top surface of image 44G will, in any event, have a blue-green cast for those portions of the forest which are in the background, since the darker coloration of the printed portion 44A will be transmitted through panel 43 and the printed area 44G to thereby project a sensation of distance by the resulting blue-green hue.

Figure 6:
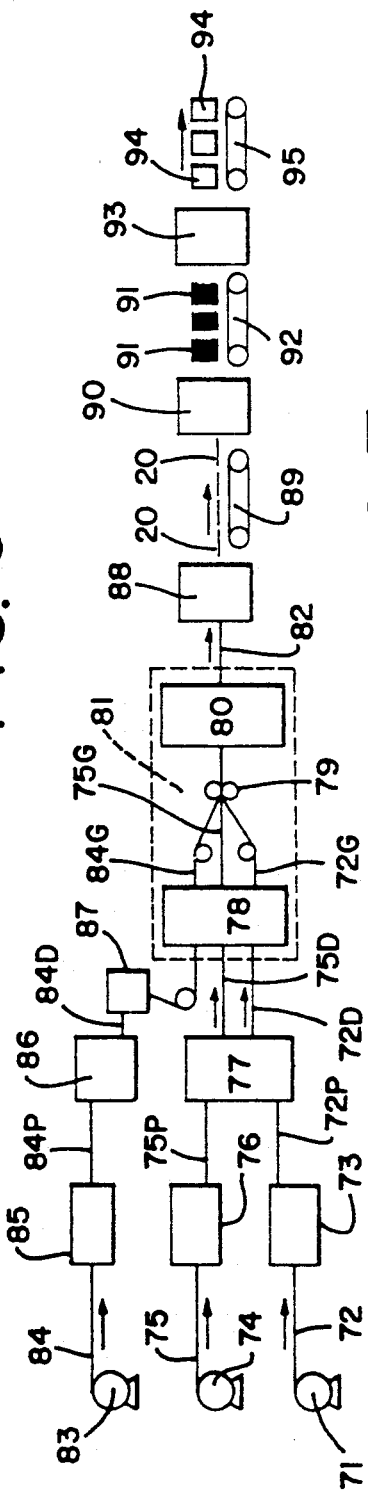
FIG. 6 is a simplified schematic representation of a production line for fabricating the laminated printed image of FIG. 1.

FIG. 6 is a simplified schematic representation of an apparatus configuration for the production of laminated structures in accordance with the laminate 20 shown in FIG. 1. The apparatus has a first roll stand 71 delivering an opaque paper web 72 to a first printer 73 which may be unlimited web offset printing units or rotogravure units. A second roll stand 74 delivers a clear transparent polymeric web 75 to a second printer 76 which also may be unlimited web offset printing units or rotogravure units. The printed webs, 72P and 75P, are passed from their printers 73 and 76, respectively, to a double web heat set oven 77 which dries the inks on the webs to produce dried printed webs 72D and 75D. The webs 72D and 75D pass into a glue applicator unit 78 where an adhesive is applied to the web surfaces in appropriate locations in order to allow for the strong lamination of the two webs to each other. The webs 72G and 75G, having glue applied thereon, next pass through a laminating nip roll station 79 which is typically part of a laminating unit 80. Laminating unit 80 imposes conditions of time, temperature and pressure upon the two webs 72G and 75G which is sufficient to cause the adhesive to set so that a resulting laminate film structure 82 is then passed from the laminating unit 80 to a rotary cutter or sheeting unit 88.

In those embodiments where the optional clear transparent cover sheet 29 is a part of the laminated product 20, the operating unit includes a third roll stand 83 for delivery of the clear transparent polymeric web 84 for the cover sheet. The clear transparent web 84 may be passed to a third printer 85, which additionally may be unlimited web offset printing units or rotogravure units. If the webs 84 passes through the printer 85, the resulting printed web 84P may be passed through a separate heat set oven 86 or it may alternately pass through the heat set oven 77. In any event the heated web 84D, now having its printed image or printed text 31 dried upon its surfaces, is passed to a die cutting unit 87 in order to produce the die cut aperture 32. The cover web 84 is then passed through the gluing unit 78 and is discharged as a web 84G having the adhesive upon selected locations of its lower surface. The web 84G also passes through the laminating nip roll station 79 and enters into the laminating unit 80.

Those skilled in the art will readily understand that the machine system will not necessarily contain the glue applicator 78, nip roll station 79, and laminating unit 80 as the individual units shown. Typically, these units are elements within a single laminating machine 81, as represented by the encompassing dashed line.

In any event, the resulting laminate web 82, whether it contains the optional surface web 84 or not, is passed to the rotary cutter or sheeting unit 88 in which individual laminates 20 are produced in accordance with FIG. 1. The individual laminates are passed by a transporting unit 89, shown as a belt conveyor, to a stacking unit 90. The stacking unit 90 discharges stacks 91 which contain a plurality of laminated structures 20. The stacks 91 are transported on a transporting unit 92, shown as a belt conveyor, into a packing unit 93. The packaging unit 93 can shrink wrap the individual stacks 91 of laminated structures 20 or paper wrap the stacks. Additionally, the packaging unit 93 may place the stacks 91 into cartons 94. The cartons 94 are in turn passed out of the covering system via a transportation means 95, as shown as a belt conveyor, for delivery to the customer or to storage and inventory.

Figure 7:
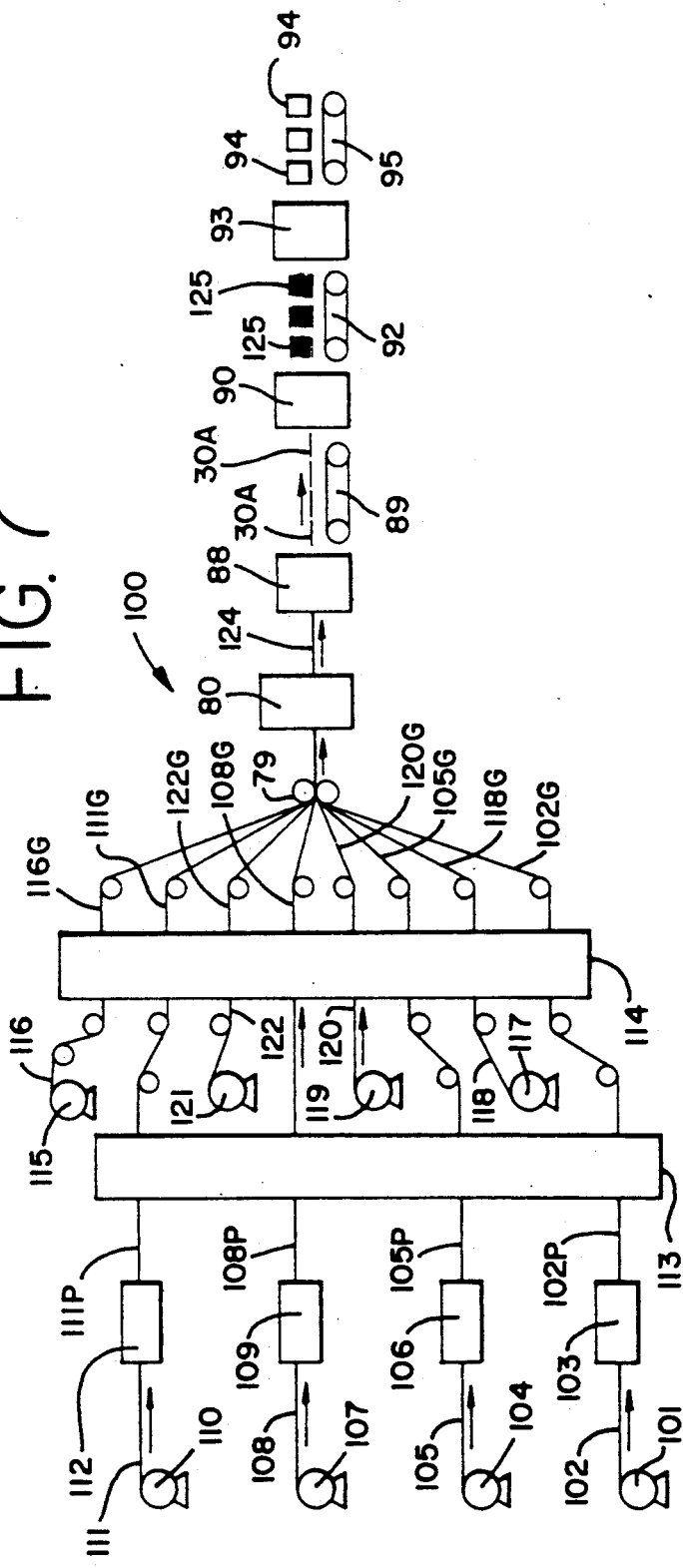
FIG. 7 is a simplified schematic representation of a production line for fabrication of the laminated printed images of FIGS. 2, 4 and 5.

FIG. 7 is a simplified schematic representation of an apparatus for production of the laminates 30, 30A and 30B in accordance with the laminate structures shown in FIGS. 2, 4 and 5. This apparatus configuration includes a first roll stand 101 delivering an opaque paper web, or an opaque polymeric web, 102 to a first printer 103, which as before noted may be multiple offset printing units or rotogravure units. The system also includes a second roll stand 104 delivering a clear transparent polymeric web 105 to a second printer 106, a third roll stand 107 delivering a clear transparent polymeric web 108 to a third printer 109, and a fourth roll stand 110 delivering a clear transparent polymeric web 111 to a fourth printer 112. The printed films 102P, 105P, 108P, and 111P are then passed to a heat set oven 113 for drying the multiple inks on the webs. The dried webs are then passed to a blue applicator 114 for the application of adhesive to the various surfaces as required to produce the final laminate.

The apparatus further includes roll stand 115 for delivering a clear transparent polymeric film 116 for providing the optional cover panel 49 which is shown in FIGS. 2, 4 and 5. Additionally, in those embodiments where the intermediate clear transparent web panels are contained in the laminate, as shown in FIGS. 4 and 5, the roll stand 117 delivers a clear transparent polymeric film 118 for providing the first spacer panels 65 shown in FIGS. 4 and 5, a roll stand 119 delivers clear transparent polymeric film 120 for providing the second spacer panel 66 shown in FIGS. 4 and 5, and another roll stand 121 delivers clear transparent polymeric web 122 for providing the third spacer panel 67 shown in FIGS. 4 and 5. In any event, all of the webs 102G, 118G, 105G, 120G, 108G, 122G, 111G, and 116G leave the gluing apparatus 114 with adhesive selectively placed in specific locations upon their surfaces. The various webs then pass through the laminating nip roll station 79 which is a typical part of the laminating unit 80. Laminating unit 80 imposes conditions of time, temperature and pressure upon the multilayer structure sufficient to produce a laminated web 124 which passes to the rotary cutter or sheeting unit 88 for the production of individual laminate units such as 30A shown in FIG. 7. The individual laminated units 30A are passed by the conveyor system 89 to the stacking unit 90 so that stacks 125 containing a plurality of laminated structures 30A are then passed by the conveying system 92 to the packaging unit 93 where they can be shrink wrapped or paper wrapped and then packed into cartons 94. The cartons 94 are then discharged by the conveyor means 95 to the shipping dock for transmission to the customer or to the warehouse for storage and inventory.

Those skilled in the art will readily understood that in the apparatus configurations shown in FIGS. 6 and 7, the webs which run from the roll stands have a substantial width of several feet. Accordingly, each printed web will generally have a plurality of identical images printed across its surface or surfaces in identical side-by-side configurations. Thus, when the finished laminate, 82 in FIG. 6 and 124 in FIG. 7, is sent to the cutting unit 88, a plurality of laminates is produced in side-by-side orientation for withdrawal by the take away transmitting unit 89 so that, in fact, when the laminates are stacked, a plurality of stacks 91 and 125 of FIGS. 6 and 7, respectively, will be passed in side-by-side stacking array to the packaging unit 93. Thus, rows of cartons 94 will be produced and withdrawn from the converting process on a single conveyor 95 having a wide belt or, preferably, on a plurality of side-by-side conveyors 95 having a belt width sufficient to take away a single row of cartons 94.

Alternatively, it is within the scope of the present invention to produce laminate structures in which a single web has been used and all of the individual images are printed upon the surface or surfaces of the web across its width in locations sufficient to provide that when the single printed web is folded appropriately, the proper laminate structure results with a correct and complete single composite image.

Referring now to FIG. 8, there is shown such a typical wide web 128 having a plurality of different images printed across one of its two surfaces. In the embodiment illustrated in FIG. 8, it is assumed that we are producing an image in accordance with the laminate structure 30A of FIG. 4. Referring now to FIG. 8, there is shown a simplified schematic representation of an end view of the wide web 128, showing the image panels 36, 39, 43 and 45, continuous with intervening spacer panels 65, 66 and 67, and with a cover panel 49, running across the width of the clear transparent polymer web. The printed images of FIG. 4 are also shown on the top surface of the image panels. Additionally shown is a plurality of web folding plows 129 at locations on the web which are sufficient to allow for folding of the eight panel web to produce a laminated structure 30A of FIG. 4 having eight separate layers.

Figure 9:
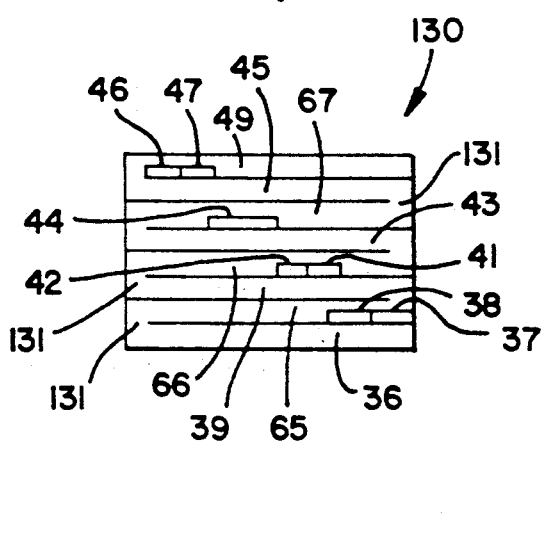
FIG. 9 is a simplified schematic representational front elevational view of the web of FIG. 8 shown in its completely folded and flat condition to produce an eight layer laminate.

This resulting laminate structure is shown in FIG. 9. It will be seen that the laminate structure 130 has a plurality of folded edges 131. In fact, there are seven folded edges. The folded edges at the left of FIG. 9 form the bottom of the laminate while those on the right form the top of the laminate to produce the composite image which is illustrated in FIG. 2. The laminate structure 130 may be produced as shown in FIG. 9 with the seven folded edges 131, or it may be cut and trimmed to eliminate the folded edges in order to produce a structure identical with the laminate structure 30A of FIG. 4. In any event, whether or not the laminate 130 of FIG. 9 has the folded edges 131 or not, the finished product will project a three-dimensional image which is identical to that of the eight layer laminate structure 30A of FIG. 4.

One apparatus configuration for the production of the laminated structure 130 of FIG. 9 is shown in FIG. 13. The apparatus includes a roll stand 132 delivering a clear transparent web of polymeric film 133 having a large width sufficient to provide all eight of the printed and clear panels in accordance with FIG. 8. The web 133 is passed from the roll stand 132 to the printer 134 which may be an offset or a rotogravure printer. In any event, the printer places the multiple images at the specific locations across the upper surface of the film web 128 as shown in FIG. 8. The printed film 128 then passes to an oven 135 for the drying of the inked images. The web 128 with the images dried upon the upper surface then passes to the glue applicator 136 for the application of adhesive on the selected locations of the surfaces of the web which are required to produce the finished laminated product 130 as shown in FIG. 9. The web next passes from the blue applicator 136 to the web folding unit 137 which produces the folded laminate structure shown in FIG. 9. This structure is then passed through the laminate producing nip roll station 79 and into the laminating unit 80 where sufficient time, temperature and pressure are applied upon the folded web to produce a finished laminate with folded edges as seen in FIG. 9. This laminate web length then passes to the cutting unit 88 where individual laminate structures 130 are produced. The individual laminate structures 130 are then passed via transporting unit 89 to the stacking unit 90 in order to produce stacks 138 containing a plurality of laminates 130. The stacks are then passed by transporting unit 92 into the packaging unit 93 wherein they can be shrink wrapped or paper wrapped into secured stacks. The stacks are then packed into cartons 94 for delivery by the conveyor means 95 to the loading dock or to the warehouse.

FIGS. 10, 11 and 12 show an alternative means of producing an eight layer laminate similar to the laminate 30A of FIG. 4. In FIG. 10 there is shown a semifolded web 139 which contains seven panels similar to the web 128 of FIG. 8, the difference being that the bottom panel is missing. It will be seen in FIG. 10 that the images which are printed on the seven panel web are those of the previously discussed FIGS. 2 and 4 with the exception that the bottom images 37 and 38 are missing. In this embodiment, the seven panel web 139 is shown as it would appear partially folded in the folding unit 137. There are folding plows 141 along each folded edge and there are web edge guides 142 along the outer edges of the web. The folding unit 137 finally produces a completely folded seven layer laminate 140 as shown in FIG. 11. The laminate 140 contains the folds 143 and its bottom layer is the clear transparent spacer panel 65 instead of an opaque bottom panel 36. In order to produce the eight layer laminate of FIG. 4, therefore, a bottom layer containing the images 37 and 38 must be added. This is shown in FIG. 12. As the folded laminate 140 is discharged from the folding unit 137, or seven within the folding unit 137, the laminate 140 is turned over until it reaches an aspect as shown in FIG. 12. It is then bonded or laminated to a paper web 36 having the images 37 and 38 printed on its upper surface. This structure then will be an eight layer laminate which produces the image identical to that of FIG. 4.

In order to produce the finished laminate which results from bonding the two portions 140 and 36 in FIG. 12, an apparatus configuration as shown in FIG. 13 may be used. The roll stand 132 produces a clear transparent polymer web 133 which has only the seven panels, and it is printed in printer 134 to produce the structure shown in FIG. 10. An additional roll stand 144 is provided to produce a separate opaque paper web 145 which is passed to a printer 146 which may be an offset or a rotogravure unit. The printed web is then passed from the printer 146 to the drying oven 135. IT passes from the drying oven 135 to the glue applicator 136 and then bypasses the folding unit 137 to meet the folded structure 140 at the nip roll station 79 from which the seven folded laminate and the paper web are then sent to the laminator 80. The finished product is converted in the remaining devices within the systems as has been previously been discussed to produce the final product in the cartons 94.

The laminate structures of the present invention are produced from layers or panels by means of webs which are derived from polymeric organic structures having an ester configuration that may be either internally within the linear chain of the polymer or external to the linear polymer chain. Typically, the polyester will be polyethylene teraphthalate. Alternatively, the polymer may be an acetate, such as polyvinyl acetate, cellulose acetate, and the like, including their copolymer variants. Additionally, the polymer may be a biaxially oriented polystyrene or a general purpose polyvinyl chloride. The important considerations are that the film selected must have excellent clarity and transparency, dimensional stability, long shelf lift, resistance to heat or low shrinkage, good temperature stability, tensile strength, good aging characteristics, and low cost. Of the utmost importance, of course, is that the film selected must have good printability so that the inks when dried upon the surface will remain firmly bonded thereto. Additionally, the polymer web must be bondable to itself with conventional adhesives. When a biodegradable film is desired, it is typical to select cellulose acetate as the polymeric film. Since paper is a mat of cellulose fibers, it is inherently biodegradable.

The polymer films and the paper which are used to make the laminate structures of this invention are generally available in thicknesses ranging from about 0.48 mil to about 5.0 mills. In general, it is preferred to use a 3 mil film or paper web for each layer of the laminate structures of this invention. Thus, a four layer laminate similar to that of FIG. 2 will have a final thickness of 12 mils, and if the FIG. 2 embodiment includes the clear transparent cover layer, it will have a five layer thickness of 15 mills. Similarly, an eight layer laminate in accordance with FIGS. 4 and 5 will have a 24 mil thickness.

It is also within the scope of the present invention to utilize a bottom sheet (either clear or opaque) for the laminates of this invention wherein a metallized upper surface is provided. The metallized surface renders the panel opaque and acts as a mirror. If the bottom sheet is merely selectively printed using metallic inks in selected areas, a highlighting and/or fading effect is created. On the other hand, if the bottom sheet is printed so that it is completely covered by a metallized layer or a metallic ink, a hologram effect is achieved, since the metal layer acts as a mirror. This mirror gives an illusion of movement to the picture or images above to thereby simulate a hologram. Biaxially oriented metallized polystyrene film may be used to simulate such holograms. This film is available from Plastic Suppliers of Columbus, Ohio under the trademark POLYFLEX ®. Metallized polyethylene teraphthalate film is available from E. I. duPont de Nemours and Co. under the tradename MYLAR ®. Other sources of such metallized films are known to those skilled in the art.

Although the present invention has been described with preferred embodiments illustrated herein, it is to be understood that other modifications and variations may be resorted to without departing from the spirit and the scope of the present invention. Such modifications and variations are considered to be within the purview and the scope of the appended claims.

We claim:

1. A printed image, suitable for creating an illusion of depth in the perception of a viewer of the image, which comprises a multilayer transparent laminate structure having a back surface and a viewing front surface, wherein at least certain layers of said multi-layer structure each have a portion of the perceived image printed upon at least one surface of each certain layer, with that portion of the image perceived to be most distant from the viewer being located upon a printed layer which is furthest from the viewing front surface of the laminate structure, with that portion of the image perceived to be most proximate to the viewer being located upon a printed layer closest to said viewing front surface, and said layers are adhered together.

2. A printed image according to claim 1 wherein at least a portion of said certain layers each has a first part of the perceived image printed upon the front surface of the layer and a second part of the perceived image printed upon the back surface of the layer.

3. A printed image according to claim 2 wherein said first part of the perceived image printed upon the front surface differs from said second part of said image printed upon the back surface.

4. A printed image according to claim 3 wherein said first part printed upon the front surface has at least one color which differs from the color of said second part printed upon the back surface.

5. A printed image according to claim 2 wherein said first part and said second part are congruent images and one of said parts has at least one color which differs from the color of the other part.

6. A printed image according to claim 2 wherein said transparent laminate structure includes at least one transparent unprinted layer between printed layers.

7. A printed image according to claim 2 further including a transparent unprinted cover layer.

8. A printed image according to claim 1 wherein said multilayer transparent laminate structure contains a plurality of layers each having a portion of the perceived image printed upon the layer front surface.

9. A printed image according to claim 8 further including at least one transparent unprinted layer between printed layers.

10. A printed image according to claim 1 wherein said multilayer transparent laminate structure contains at least one unprinted layer between printed layers.

11. A printed image according to claim 1 wherein at least a portion of said layers of the multilayer laminate structure are adjacent layers connected at a folded edge.

12. A printed image according to claim 1 wherein said multilayer transparent laminate structure includes an opaque back layer.

13. A printed image according to claim 12 wherein said back layer comprises a paper web.

14. A printed image according to claim 13 wherein said paper web has a metallized front surface.

15. A printed image according to claim 12 wherein said back layer comprises a polymeric web.

16. A printed image according to claim 15 wherein said polymeric web has a metallized front surface.

17. A printed image according to claim 1 wherein said multilayer laminate structure includes a back layer having a metallized coating upon at least a portion of the back layer front surface.

18. A printed image according to claim 1 wherein said multilayer laminate structure includes a layer containing a die cut opening.

19. A printed image according to claim 18 wherein said die cut opening is in an opaque layer.

20. A printed image according to claim 19 wherein said opaque layer is between transparent layers.

21. A printed image according to claim 18 wherein said die cut opening is in a transparent layer.

22. A printed image according to claim 1 wherein the portions of the image perceived to be at varying distances are located upon printed, intermediate layers, between the portions of the image that are perceived as most proximate to and furthest from the viewer, in a sequence which corresponds to the perceived varying distances of the intermediate image portions.

23. A printed image according to claim 1 wherein at least a majority of said image portions are dissimilar parts of the perceived image.

24. A printed image according to claim 1 wherein at least a majority of said image portions are noncongruent parts of the perceived image.

25. A printed image, suitable for creating an illusion of depth in the perception of a viewer of the image, which comprises a multilayer transparent laminate structure having a back surface and a viewing front surface, wherein at least a number of the layers in said laminate structure each have a portion of the perceived image printed upon at least one surface of the layer front and back surfaces, with that portion of the image perceived to be most distant from the viewer being located upon a printed layer which is furthest from the viewing front surface of the laminate structure, with that portion of the image perceived to be most proximate to the viewer being located upon a printed layer closest to said viewing front surface, with the portions of the image perceived to be at varying distances therebetween being located upon intermediate printed layers in a sequence which corresponds to the perceived varying distances of the intermediate image portions, with at least one pair of adjacent printed layers having a clear transparent unprinted layer therebetween, and wherein said layers are adhered together.

26. A printed image according to claim 25 wherein at least a majority of said image portions are dissimilar parts of the perceived image.

27. A printed image according to claim 25 wherein at least a majority of said image portions are noncongruent parts of the perceived image.

28. A printed image according to claim 25 wherein at least a portion of said number of layers each has a first part of the perceived image printed upon the front surface of the layer and a second part of the perceived image printed upon the back surface of the layer.

29. A printed image according to claim 28 wherein said first part of the perceived image printed upon the front surface differs from said second part of said image printed upon the back surface.

30. A printed image according to claim 29 wherein said first part printed upon the first surface has at least one color which differs from the color of said second part printed upon the back surface.

31. A printed image according to claim 28 wherein said first part and said second part are congruent images and one of said parts has at least one color which differs from the color of the other part.

32. A printed image according to claim 28 wherein said transparent laminate structure includes a plurality of transparent unprinted layers between printed layers.

33. A printed image according to claim 25 wherein said multilayer transparent laminate structure contains a plurality of layers each having a portion of the perceived image printed upon the layer front surface.

34. A printed image according to claim 33 further including a plurality of transparent unprinted layers between printed layers.

35. A printed image according to claim 25 wherein said multilayer transparent laminate structure contains at least one unprinted opaque layer between printed layers, and said opaque layer contains a cut-out portion.

36. A printed image according to claim 25 wherein at least a portion of said layers of the multilayer laminate structure are adjacent layers connected at a folded edge.

37. A printed image, suitable for creating an illusion of depth in the perception of a viewer of the image, which comprises a multilayer transparent laminate structure having a back surface and a viewing front surface, wherein at least a number of the layers in said laminate structure each have a portion of the perceived image printed upon at least one surface of the layer front and back surfaces, with that portion of the image perceived to be most distant from the viewer being located upon a printed layer which is furthest from the viewing front surface of the laminate structure, with that portion of the image perceived to be most proximate to the viewer being located upon a printed layer closest to said viewing front surface, with at least a majority of said image portions being dissimilar parts of the perceived image, and wherein said layers are adhered together.

38. A printed image according to claim 37 wherein at least a portion of said number of layers has a first part of the perceived image printed upon the front surface of the layer and a second part of the perceived image printed upon the back surface of the layer.

39. A printed image according to claim 38 wherein said first part of the perceived image printed upon the front surface differs from said second part of said image printed upon the back surface.

40. A printed image according to claim 39 wherein said first part printed upon the first surface has at least one color which differs from the color of said second part printed upon the back surface.

41. A printed image according to claim 38 wherein said first part and said second part are congruent images and one of said parts has at least one color which differs from the color of the other part.

42. A printed image according to claim 38 wherein said transparent laminate structure includes at least one transparent unprinted layer between printed layers.

43. A printed image according to claim 37 wherein said multilayer transparent laminate structure contains a plurality of layers each having a portion of the perceived image printed upon the layer front surface.

44. A printed image according to claim 43 further including at least one transparent unprinted layer between printed layers.

45. A printed image according to claim 37 wherein said multilayer transparent laminate structure contains at least one unprinted layer between printed layers.

46. A printed image according to claim 37 wherein at least a portion of said layers of the multilayer laminate structure are adjacent layers connected at a folded edge.

* * * * *